(12) United States Patent
Browning et al.

(10) Patent No.: US 8,472,537 B2
(45) Date of Patent: Jun. 25, 2013

(54) SYSTEMS AND ASSOCIATED METHODS TO REDUCE SIGNAL FIELD SYMBOL PEAK-TO-AVERAGE POWER RATIO (PAPR)

(75) Inventors: David M. Browning, West Melbourne, FL (US); John E. Hoffmann, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 599 days.

(21) Appl. No.: 12/715,719

(22) Filed: Mar. 2, 2010

(65) Prior Publication Data
US 2011/0216814 A1    Sep. 8, 2011

(51) Int. Cl.
*H04K 1/10* (2006.01)

(52) U.S. Cl.
USPC ........... 375/260; 375/219; 375/220; 375/285; 375/295; 375/296; 455/63.1; 455/67.13; 455/114.3; 455/501

(58) Field of Classification Search
USPC . 375/219, 220, 260, 285, 295, 296; 455/63.1, 455/67.13, 114.3, 501; 370/335, 338, 342; 330/149; 327/551
See application file for complete search history.

(56) References Cited

U.S. PATENT DOCUMENTS

| | | | |
|---|---|---|---|
| 6,925,128 B2 | 8/2005 | Corral | 375/260 |
| 7,301,891 B2 | 11/2007 | Park et al. | 370/208 |
| 7,496,028 B2 | 2/2009 | Jung et al. | 370/208 |
| 8,203,929 B2 * | 6/2012 | Atungsiri et al. | 370/203 |
| 8,320,301 B2 * | 11/2012 | Walton et al. | 370/328 |
| 2005/0089116 A1 | 4/2005 | Moffatt et al. | 375/295 |
| 2006/0007898 A1 * | 1/2006 | Maltsev et al. | 370/338 |
| 2008/0075191 A1 | 3/2008 | Haartsen | 375/285 |

FOREIGN PATENT DOCUMENTS
WO    WO2005/067216    7/2005

OTHER PUBLICATIONS

"Synchronization for Broadband OFDM Mobile Ad Hoc Networking: Simulation and Implementation", Kleider et al., General Dynamics Decision Systems, Scottsdale, Arizona, USA, pp. IV-3756-IV-3759, 0-7803-7402-9/02$17.00 © 2002 IEEE.
"802.11a Wireless LAN", 4 pages, VOCAL Technologies, Ltd. © 2009. Available at http://www.vocal.com/redirect/802_11a.html.

* cited by examiner

*Primary Examiner* — Leon Flores
(74) *Attorney, Agent, or Firm* — Allen, Dyer, Doppelt, Milbrath & Gilchrist, P.A.

(57) ABSTRACT

The device, system and method reduce the peak-to-average power ratio (PAPR) of a signal field symbol in a multi-carrier modulation communication signal. The device includes an antenna, a transceiver coupled to the antenna, and a controller to cooperate with the transceiver and being configured to reduce the PAPR of the signal field symbol in the multi-carrier modulation communication signal. The controller is configured to transmit information using a frame format including a header and a data field, the header having a signal field and a service field each having a plurality of bits, the plurality of bits of the signal field defining the signal field symbol. The controller selectively changes at least the header bits to generate the signal field symbol with a reduced or lowest PAPR.

12 Claims, 11 Drawing Sheets

| | | | | | | | PPDU FRAME | | | |
|---|---|---|---|---|---|---|---|---|---|---|
| | | | PLCP HEADER | | | | | | | |
| | | SIGNAL SYMBOL | | | | | | | | |
| | RATE | RESERVED | LENGTH | PARITY | TAIL | SERVICE | PDSU | FILLER | TAIL | PAD |
| | 4 BITS | 1 BIT | 12 BITS | 1 BIT | 6 BITS | 16 BITS | | | 6 BITS | |
| ORIGINAL | 6 Mbps | | 1234 | | | 0 | | 0 | | 10 |
| METHOD 2 | 6 Mbps | | 1239 | | | 5 | | 5 | | 5 |
| ORIGINAL | 54 Mbps | | 726 | | | 0 | | 0 | | 202 |
| METHOD 2 | 54 Mbps | | 887 | | | 161 | | 161 | | 41 |
| ORIGINAL | 30 Mbps | | 432 | | | 0 | | 0 | | 106 |
| METHOD 2 | 30 Mbps | | 497 | | | 65 | | 65 | | 41 |

| MODE OF OPERATION | RATE | LENGTH (PACKET SIZE) | SERVICE FIELD |
|---|---|---|---|
| PAPR OFF | 0 | 4095 | 0 |
| PAPR ON | 0 | 0 | +4095 |
| PAPR OFF | 3 | 4095 | 0 |
| PAPR ON | 3 | 4094 | +1 |
| PAPR OFF | 5 | 2000 | 0 |
| PAPR ON | 5 | 2010 | -10 |

| | PPDU FRAME | | | | | | | |
|---|---|---|---|---|---|---|---|---|
| | PLCP HEADER | | | | | | | |
| | SIGNAL SYMBOL | | | | | | | |
| | RATE<br>4 BITS | RESERVED<br>1 BIT | LENGTH<br>12 BITS | PARITY<br>1 BIT | TAIL<br>6 BITS | SERVICE<br>16 BITS | PSDU | FILLER | TAIL<br>6 BITS | PAD |
| ORIGINAL | 6 Mbps | | 1234 | | | 0 | | 0 | | 10 |
| METHOD 2 | 6 Mbps | | 1239 | | | 5 | | 5 | | 5 |
| ORIGINAL | 54 Mbps | | 726 | | | 0 | | 0 | | 202 |
| METHOD 2 | 54 Mbps | | 887 | | | 161 | | 161 | | 41 |
| ORIGINAL | 30 Mbps | | 432 | | | 0 | | 0 | | 106 |
| METHOD 2 | 30 Mbps | | 497 | | | 65 | | 65 | | 41 |

FIG. 9

SYSTEMS AND ASSOCIATED METHODS TO REDUCE SIGNAL FIELD SYMBOL PEAK-TO-AVERAGE POWER RATIO (PAPR)

FIELD OF THE INVENTION

The present invention relates to the field of communications, and, more particularly, to wireless data communications and related methods.

BACKGROUND OF THE INVENTION

The peak-to-average power ratio ("PAPR"), also known as peak-to-mean power ratio ("PMPR") or peak factor, may be an important characteristic of multi-carrier transmitted signals. The peak of the signal can often be N times greater than the average power level. These large peaks may cause inter-modulation distortion which can result in an increase in the error rate. These distortions are typically caused by the limitations inherent in a transmitting amplifier.

To prevent the transmitter amplifier from limiting (clipping), the average signal power is typically kept low enough to keep the signal relatively linear through the amplifier. To transmit a high power signal, a high power amplifier may be used which requires a large DC system power. A much higher power amplifier is typically used to transmit multi-carrier waveforms than for constant envelope waveforms. For example, using 64 carrier waveforms, a 40 dBm power amplifier would require about 15 dB of back off. Therefore, instead of operation at 40 dBm (10 watts) the amplifier is only capable of operating at 25 dBm (0.316 Watts). Thus to transmit at the desired 40 dBm, a 55 dBm (316 Watt) amplifier would be needed. In addition, such large power requirements may lead to associated increased space demands and heat dissipation requirements.

With the large amount of interest and activity with Orthogonal Frequency Division Modulation (OFDM), and in particular with IEEE 802.11a and 802.11g communication technology, the PAPR problem is exaggerated. The IEEE 802.11 standard with its use of complex waveforms may require highly linear RF amplifiers. Current IEEE 802.11 physical layer integrated circuits have not implemented PAPR reduction schemes. In particular, multi-tone OFDM typically requires greater than 10 dB power amplifier back-off because of a high peak-to-average power ratio. The net result of these factors may be increased DC power demand beyond that encountered with other IEEE 802.11 techniques. The effect may be less noticeable for short duty cycle signals, but can be significant for situations requiring continuous transmission of data.

OFDM, as mentioned above, is a method of transmitting data simultaneously over multiple equally-spaced and phase synchronized carrier frequencies, using Fourier transform processing for modulation and demodulation. The method has been proposed and adopted for many types of radio systems, such as wireless Local Area Networks ("LAN") and digital audio and digital video broadcasting. OFDM offers many well-documented advantages for multi-carrier transmission at high data rates, particularly in mobile applications. Specifically, it has inherent resistance to dispersion in the propagation channel. Furthermore, when coding is added it is possible to exploit frequency diversity in frequency selective fading channels to obtain excellent performance under low signal-to-noise conditions. For these reasons, OFDM is often preferable to constant envelope modulation with adaptive equalization and is arguably less complex to implement.

The principal difficulty with OFDM, as alluded to above, is that when the sinusoidal signal of the N carriers add mostly constructively, the peak envelope power is as much as N times the mean envelope power. If the peak envelope power is subject to a design or regulatory limit then this has the effect of reducing the mean envelope power allowed under OFDM relative to that allowed under constant envelope modulation. If battery power is a constraint, as is typically the case with portable equipment such as mobile consumer appliances, and laptops, then the power amplifiers required to behave linearly up to the peak envelope power may be operated inefficiently with considerable back-off from compression. Digital hard limiting of the transmitted signal has been shown to alleviate the problem, but only at the cost of spectral sidelobe growth and consequential bit error performance degradation.

The IEEE 802.11a standard specifies an OFDM physical layer (PHY) that splits an information signal across 52 separate subcarriers to provide transmission of data at a rate of 6, 9, 12, 18, 24, 36, 48, or 54 Mbps. The 6, 12, and 24 Mbps data rates are mandatory. Four of the subcarriers are pilot subcarriers that the system uses as a reference to disregard frequency or phase shifts of the signal during transmission. A pseudo binary sequence is sent through the pilot subchannels to reduce the generation of spectral lines. The remaining 48 subcarriers provide separate wireless pathways for sending the information in a parallel fashion. The resulting subcarrier frequency spacing is 0.3125 MHz (for a 20 MHz channel with 64 possible subcarrier frequency slots).

The primary purpose of the OFDM PHY layer is to transmit Media Access Control (MAC) protocol data units (MPDUs) as directed by the IEEE 802.11 MAC layer. The OFDM PHY layer is divided into two elements: the physical layer convergence protocol (PLCP) and the physical medium dependent (PMD) sublayers.

The MAC layer communicates with the PLCP via specific primitives through a PHY service access point. When the MAC layer instructs, the PLCP prepares MPDUs for transmission. The PLCP also delivers incoming frames from the wireless medium to the MAC layer. The PLCP sublayer minimizes the dependence of the MAC layer on the PMD sublayer by mapping MPDUs into a frame format suitable for transmission by the PMD.

Under the direction of the PLCP, the PMD provides actual transmission and reception of PHY entities between two stations through the wireless medium. To provide this service, the PMD interfaces directly with the air medium and provides modulation and demodulation of the frame transmissions. The PLCP and PMD communicate using service primitives to govern the transmission and reception functions.

FIG. 1 illustrates the frame format for an IEEE 802.11a frame as in the prior art. The PLCP preamble field is present for the receiver to acquire an incoming OFDM signal and synchronize the demodulator. The preamble has 12 symbols. Ten of the symbols are short for establishing Automatic Gain Control (AGC) and the coarse frequency estimate of the carrier signal. The receiver uses the long symbols for fine-tuning. With this preamble, it takes 16 microseconds to train the receiver after first receiving the frame.

With additional reference to FIG. 2, the signal field has 24 bits, defining data rate and frame length. A reserved bit, parity bit and tail bits are included. The IEEE 802.11a version of OFDM uses a combination of binary phase shift keying (BPSK), quadrature PSK (QPSK), and quadrature amplitude modulation (QAM), depending on the chosen data rate. The length field identifies the number of octets in the frame. The signal symbol field is convolutionally encoded and sent at 6

Mbps using BPSK no matter what data rate the signal field indicates. The convolutional encoding rate of the signal symbol is 1/2.

With additional reference to FIG. 3, the service field has 16 bits, with some bits as zeros to synchronize the descrambler in the receiver, and the remaining bits being reserved for future use (and set to zeros). The PLCP service data unit (PSDU) is the payload from the MAC layer being sent. The pad field contains at least six bits, but it is actually the number of bits that make the data field a multiple of the number of coded bits in an OFDM symbol (48, 96, 192, or 288).

With IEEE 802.11a OFDM modulation, the binary serial signal is divided into groups (symbols) of one, two, four, or six bits, depending on the data rate chosen, and converted into complex numbers representing applicable constellation points.

Various conventional approaches address the PAPR for OFDM packets. For example, U.S. Patent Application Publication 2005/0089116 to Moffatt et al. (and assigned to Harris Corporation of Melbourne, Fla. the assignee of the present invention) describes a predictive signal producing method that effectively levels transmitter output power in a multi-carrier communication system and results in approaching amplifier performance normally associated with constant carrier waveforms. The disclosed approach offers >10 dB reduction in the peak-to-average power required to support the transmission of OFDM modulation techniques.

Other approaches are described in U.S. Pat. No. 7,496,028 to Jung et al., U.S. Pat. No. 7,301,891 to Park et al., and U.S. Pat. No. 6,925,128 to Corral.

However, there may be a desire to further address the PAPR.

SUMMARY OF THE INVENTION

In view of the foregoing background, it is therefore an object of the present invention to provide a method, device and associated system that reduce the PAPR in a multi-carrier modulation communication signal.

This and other objects, features, and advantages in accordance with the present invention are provided by a wireless communications device using multi-carrier modulation communication signals. A wireless communication system may include a plurality of such devices. The device including an antenna, a transceiver coupled to the antenna, and a controller to cooperate with the transceiver and being configured to reduce the peak-to-average power ratio (PAPR) of a signal field symbol in the multi-carrier modulation communication signal. The controller is configured to transmit information using a frame format comprising a header and a data field, the header having a signal field and a service field each having a plurality of bits, the plurality of bits of the signal field defining the signal field symbol, and to selectively change at least the header bits to generate the signal field symbol with a reduced PAPR.

The controller may be further configured to transmit the information using a physical layer convergence protocol (PLCP) to map data into the frame format. The signal field may include data rate bits, a reserved bit and data length bits. The controller may be further configured to selectively change the header bits by setting at least one of the data rate bits to generate the signal field symbol with a reduced or lowest PAPR. The controller may be further configured to selectively change the header bits by setting the reserved bit to generate the signal field symbol with reduced or lowest PAPR. The controller may be further configured to selectively change the header bits by setting the data length bits and the service field bits to generate the signal field symbol with reduced or lowest PAPR.

The controller may be further configured to selectively change the header bits by setting the data length bits to result in the signal field symbol with reduced or lowest PAPR, and setting the service field bits to indicate a correct data length.

The plurality of bits of the data field may include payload bits and pad bits. The controller may be further configured to selectively change the header bits by setting the data length bits, the service field bits and the pad bits to generate the signal field symbol with reduced or lowest PAPR.

Another aspect of the present invention is directed to a method for reducing the peak-to-average power ratio (PAPR) of a signal field symbol in a multi-carrier modulation communication signal. The method includes transmitting information using a frame format comprising at least a header and a data field, the header having a signal field and a service field each having a plurality of bits, the plurality of bits of the signal field defining the signal field symbol. The method further includes selectively changing at least the header bits to generate the signal field symbol with a reduced PAPR.

Transmitting information may include using a physical layer convergence protocol (PLCP) to map data into the frame format. The signal field may include data rate bits, a reserved bit and data length bits. Selectively changing the header bits may include setting at least one of the data rate bits to generate the signal field symbol with reduced or lowest PAPR. Alternatively, selectively changing the header bits may include setting the reserved bit to generate the signal field symbol with reduced or lowest PAPR. Also, selectively changing the header bits may include setting the data length bits and the service field bits to generate the signal field symbol with reduced or lowest PAPR.

Selectively changing the header bits may further include setting the data length bits to result in the signal field symbol with the lowest PAPR, and setting the service field bits to indicate a correct data length. Furthermore, the plurality of bits of the data field may include payload bits and pad bits, and wherein selectively changing further includes setting the data length bits, the service field bits and the pad bits to generate the signal field symbol with the lowest PAPR. Selectively changing may further include setting the data length bits to result in the signal field symbol with the lowest PAPR, using filler bits as pad bits to adjust for the set data length, and setting the service field bits to indicate a correct data length.

The embodiments of the present invention may result in increased range for multi-carrier modulation communication signals, such as for OFDM waveforms.

BRIEF DESCRIPTION OF THE DRAWINGS

FIG. 7 is a chart illustrating comparisons for example rates and packet size with and without the reduced peak-to-average power ratio (PAPR) of the signal field symbol in accordance with an embodiment of the present invention.

FIG. 8 is a schematic diagram illustrating the bits for the examples of FIG. 7.

FIG. 9 is a chart illustrating comparisons for example rates and packet size with and without the reduced peak-to-average power ratio (PAPR) of the signal field symbol in accordance with another embodiment of the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 6:
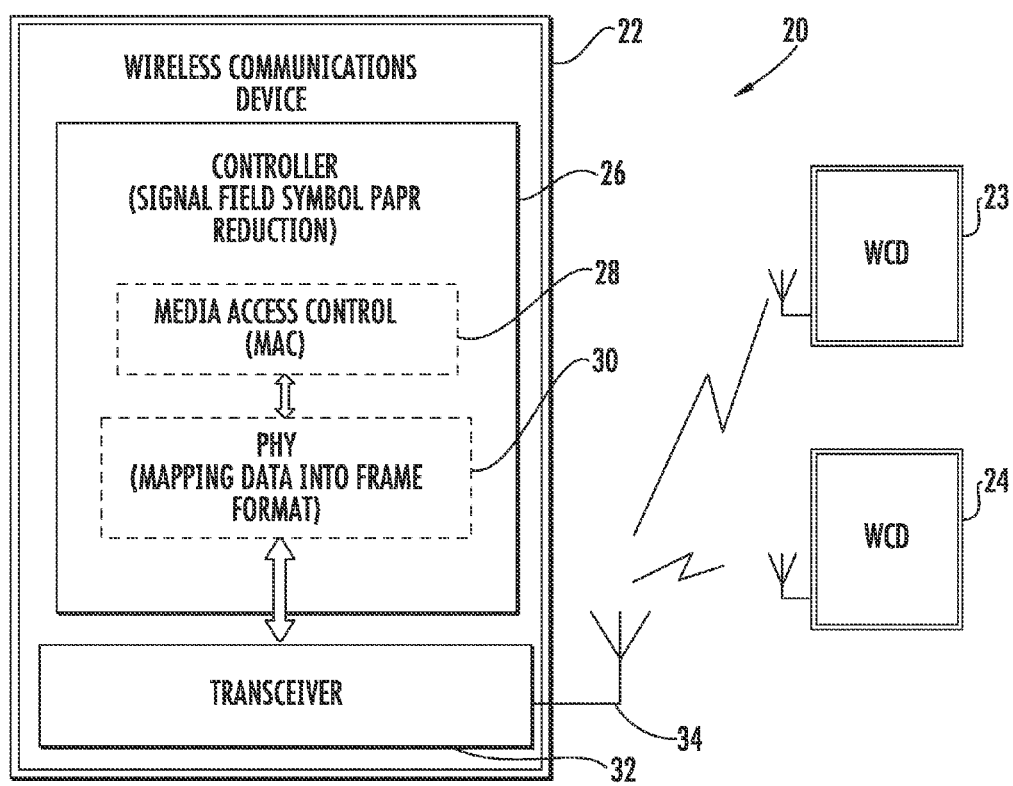
FIG. 6 is a schematic diagram of a wireless communications device in a wireless communications system with reduction of the peak-to-average power ratio (PAPR) of a signal field symbol in accordance with features of the present invention.

Referring initially to FIG. 6, a wireless communications device 22 operating in a wireless communication system 20 that includes a plurality of such devices 23/24, will be described. The wireless communication device transmits and receives data using multi-carrier modulation communication signals, e.g. Orthogonal Frequency Division Modulation (OFDM), and in particular IEEE 802.11a compliant communication. The wireless communications device 22 may be any suitable type of mobile or fixed device capable of communicating over wireless channels such as radios, computers, personal data assistants (PDAs), etc.

The wireless communications device 22 includes an antenna 34, a transceiver 32 coupled to the antenna, and a controller 26 to cooperate with the transceiver and being configured to reduce the peak-to-average power ratio (PAPR) of a signal field symbol in the multi-carrier modulation communication signals, as will be discussed further below. By way of example, the controller 26 may be implemented using a processor, memory, software, etc., as will be appreciated by those of skill in the art.

Furthermore, the transceiver 32 may include wireless modems, wireless local area network (LAN) devices, cellular telephone devices, etc. By way of example, one or more phased array antennas or directive beam antennas (as well as other suitable antennas) may be used as the antenna 34, as will be appreciated by those skilled in the art. It will further be understood that the other wireless communications devices 23/24 also preferably include suitable controllers/transceivers as well, which are not shown in FIG. 6 for clarity of illustration.

Figure 1:
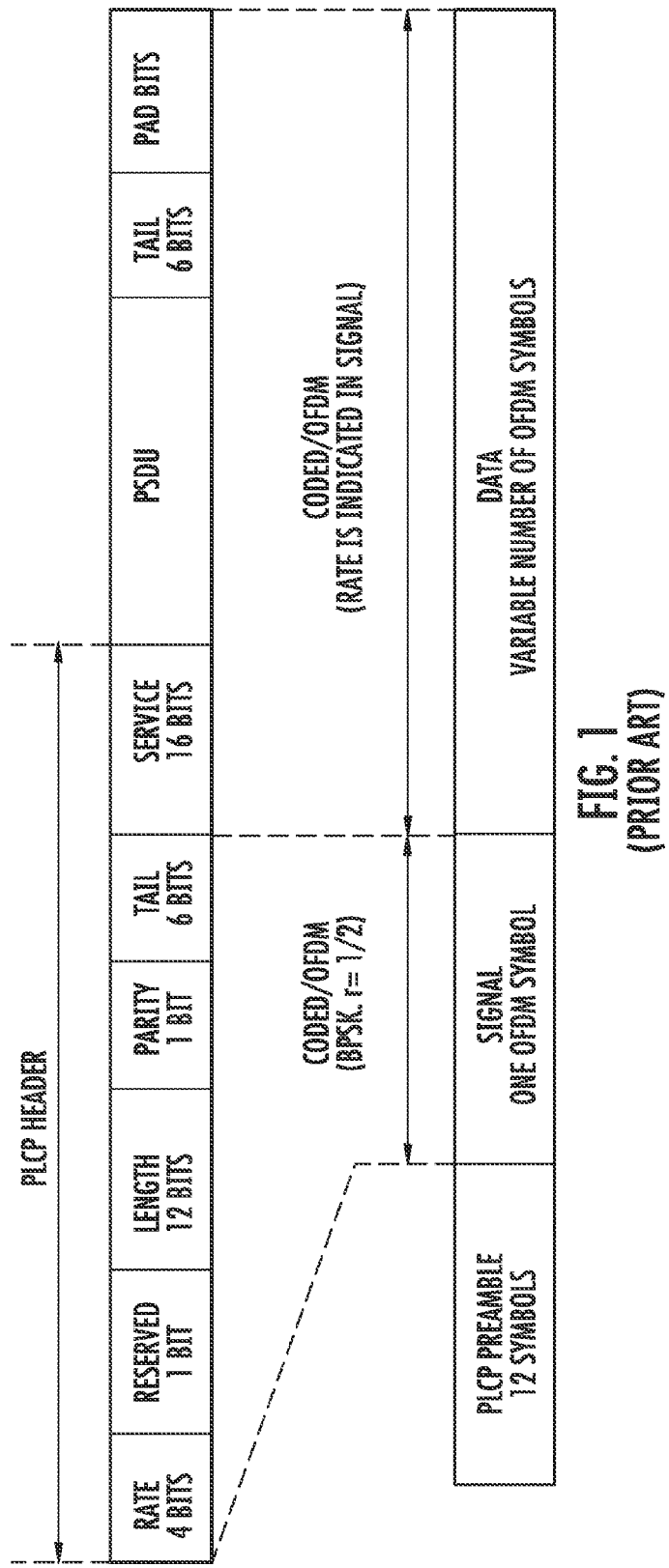
FIG. 1 is a schematic diagram illustrating a frame format for an IEEE 802.11a standard frame according to the prior art.
Figure 2:
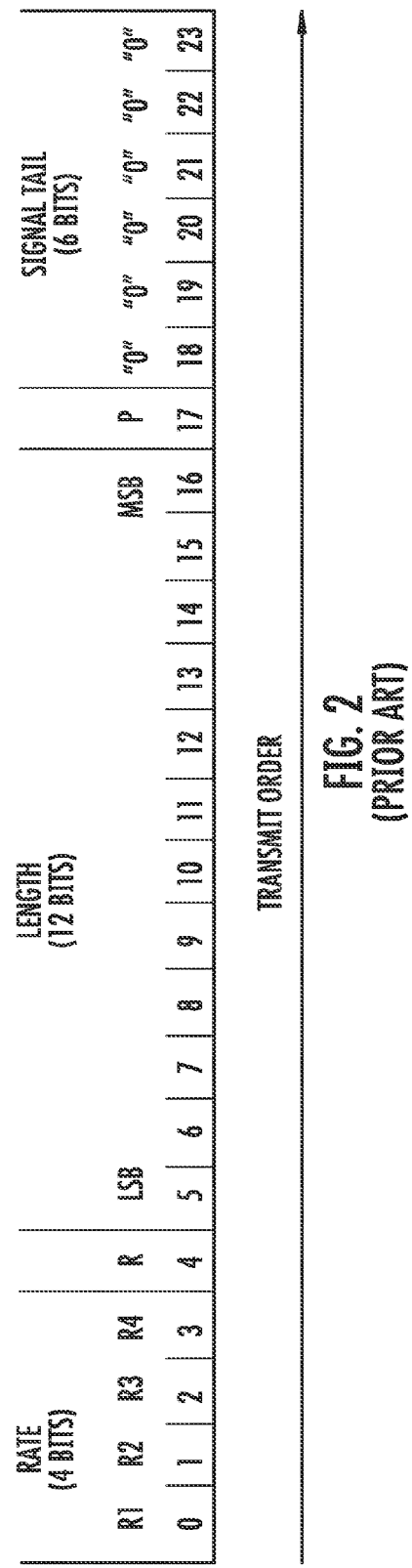
FIG. 2 is a schematic diagram illustrating a signal field bit format for the frame format of FIG. 1.
Figure 3:
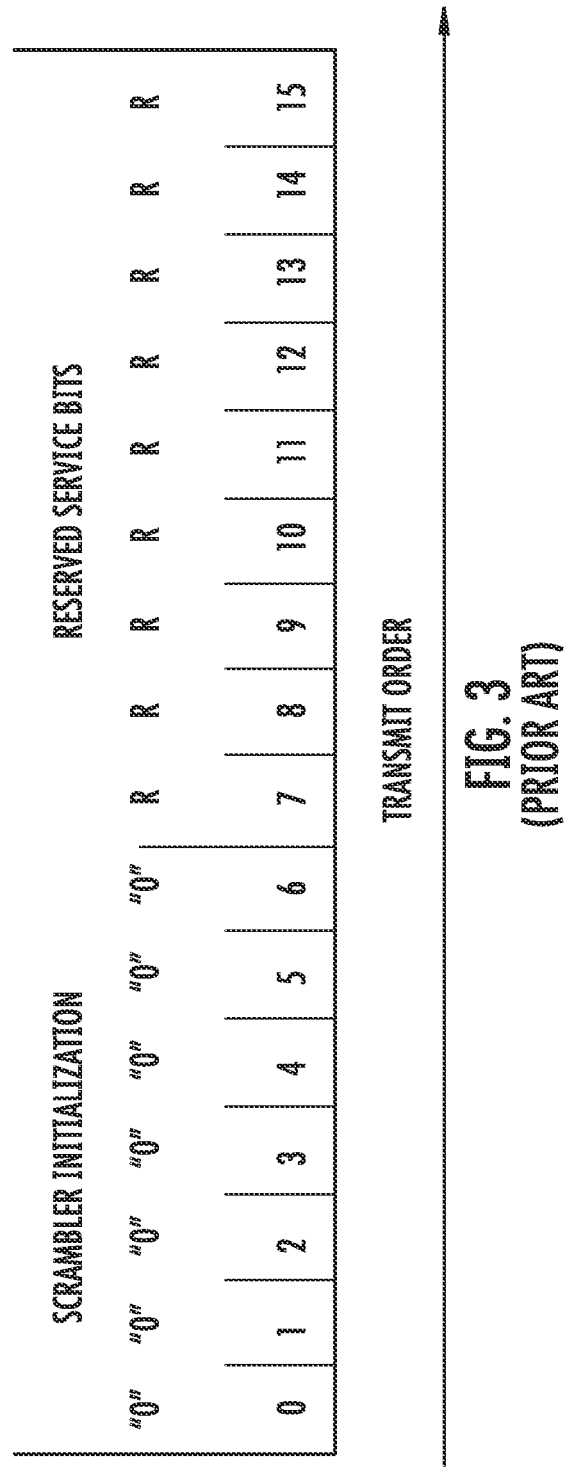
FIG. 3 is a schematic diagram illustrating a service field bit format for the frame format of FIG. 1.

The controller is configured to transmit information using a frame format (e.g. The 802.11a frame format as illustrated in FIG. 1) including at least a header and a data field. The header (e.g. PLCP header illustrated in FIG. 1) has a signal field (e.g. as illustrated in FIG. 2) and a service field (e.g. as illustrated in FIG. 3) each having a plurality of bits. The plurality of bits of the signal field define the signal field symbol.

The controller 26 at least includes a Media Access Control (MAC) layer 28 and a Physical (PHY) layer 30, e.g. in accordance with a multilayer protocol hierarchy. Data communications within wireless communications networks 20 typically follow an interconnection architecture (e.g. Open System Interconnection "OSI" or some variation thereof), as do other wireless networks (e.g., wireless LANs). By way of background, the OSI is a network protocol hierarchy which includes seven different control layers, namely (from highest to lowest) the application layer, presentation layer, session layer, transport layer, network layer, data link/media access control (MAC) layer, and physical layer.

Generally, in the OSI model control is passed from one layer to the next at an originating node or terminal starting at the application layer and proceeding to the physical layer. The data is then transmitted, and when it is received at the destination terminal/node, it is processed in reverse order back up the hierarchy (i.e., from the physical layer to the application layer). Furthermore, data corresponding to each particular layer is typically organized in protocol data units (PDUs) or MAC PDUs (MPDUs) referred to as packets at the network layer.

The controller 26 similarly operates in accordance with a multi-layer protocol hierarchy which may include a plurality of upper protocol layers (e.g. application layer, presentation layer, session layer, transport layer) which are not shown for ease of illustration, and a plurality of relatively lower protocol layers including the MAC or data link layer 28, and the physical or PHY layer 30.

The primary purpose of the PHY 30 (e.g. OFDM PHY) is to transmit Media Access Control (MAC) protocol data units (MPDUs) as directed by the MAC 28, e.g. 802.11a MAC layer. The PHY includes a convergence protocol, e.g. the physical layer convergence protocol (PLCP), and the physical medium dependent (PMD) sublayer.

The MAC layer communicates with the PLCP and when the MAC layer instructs, the PHY (e.g. via the PLCP) prepares MPDUs for transmission. The PHY layer 30 also delivers incoming frames from the wireless medium to the MAC layer. The PHY layer 30 maps the data (i.e. MPDUs) into a frame format suitable for transmission. Under the direction of the convergence protocol, e.g. the PLCP, the PHY provides modulation and demodulation of the frame transmissions.

Figure 4:
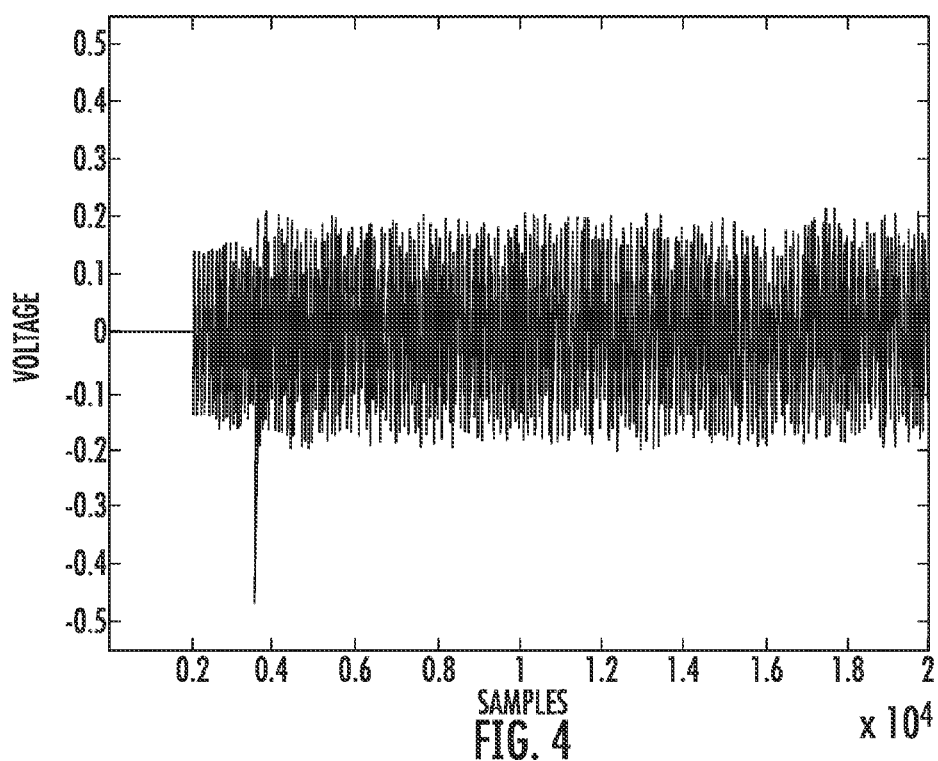
FIGS. 4 and 5 are time domain plots illustrating PAPR problems associated with a conventional signal field symbol transmission.
Figure 5:
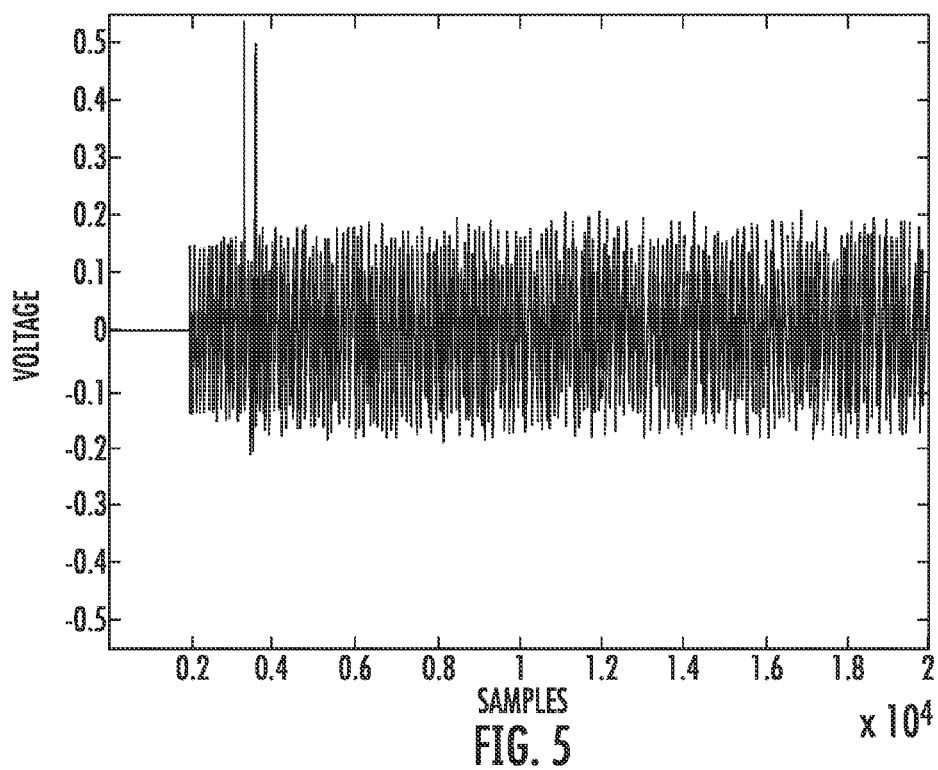

As discussed above, conventional approaches do not address the PAPR of the signal field symbol. For example, the time domain plots illustrated in FIGS. 4 and 5 show examples of signal field symbol peaks for a data rate of 18 Mbps and a 4054 byte packet, and for a data rate of 24 Mbps and a 1090 byte packet, respectively. To address this problem and reduce the PAPR of the signal field symbol, the controller 26, e.g. via the PHY 30 and the convergence protocol, selectively changes or manipulates the header bits to generate the signal field symbol with reduced or lowest PAPR.

The approach for reducing the PAPR of the signal field symbol by selectively changing or manipulating the header bits may include various embodiments as will be described below. As discussed above, the signal field may include data rate bits, a reserved bit and data length bits (e.g. as shown in FIGS. 1 and 2). So, in one embodiment, selectively changing the header bits may include setting the data length bits and the service field bits to generate the signal field symbol with a reduced or lowest PAPR. For example, the unused service bits can relay a delta or change (+/−) from the data length field. In other words, the controller 26, e.g. via the PHY 30 and the convergence protocol, picks a length field for reduced or lowest PAPR, rather than the actual length field, knowing that the delta indicated in the service field can correct to the actual length field at the receiver.

Figure 8:
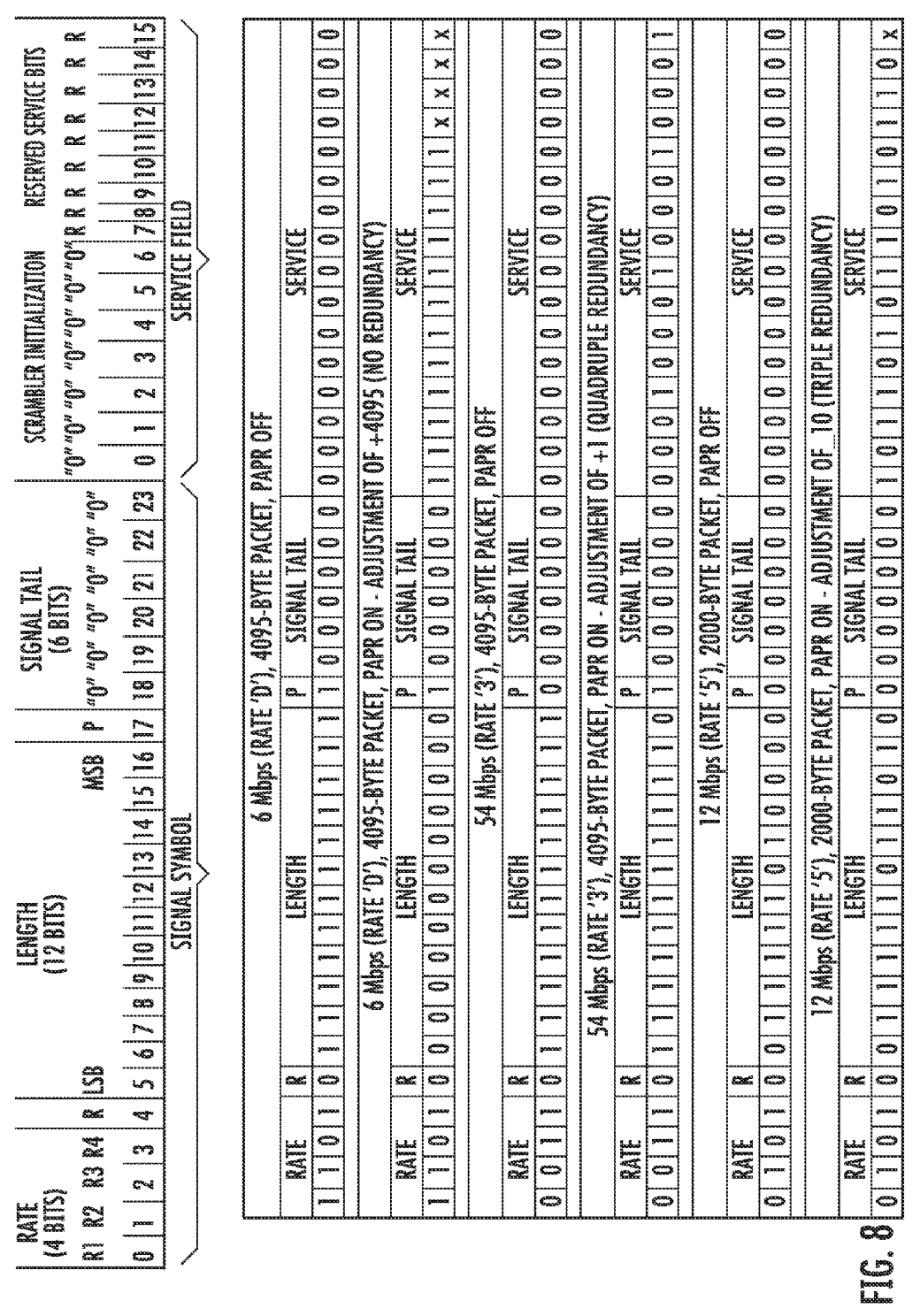

Referring to FIG. 7, a chart is illustrated to compare example rates and packet size with and without the reduced peak-to-average power ratio (PAPR) of the signal field symbol in accordance with this embodiment of the present invention. FIG. 8 is a schematic diagram illustrating the bits for the examples of FIG. 7. The examples are provided for various rates and packet sizes. So, as can be seen in the examples, selectively changing the header bits may include setting the data length bits to result in the signal field symbol with a reduced or lowest PAPR, and setting the service field bits to indicate a correct data length.

Furthermore, the plurality of bits of the data field may include payload bits and pad bits (e.g. as shown in FIG. 1). In another embodiment, selectively changing further includes setting the data length bits, the service field bits and the pad bits to generate the signal field symbol with a reduced or lowest PAPR. The data length bits may be set to result in the signal field symbol with a reduced or lowest PAPR, using filler bits as pad bits to adjust for the set data length, and setting the service field bits to tell the receiver how many filler bits to ignore from what was actually indicated in the set length field. In other words, the controller 26, e.g. via the PHY 30 and the convergence protocol, picks a length field for reduced or lowest PAPR, rather than the actual length field, knowing that the indication in the service field can indicate to the receiver how many filler bits to ignore or remove, i.e. to correct to the actual length field at the receiver.

The filler bits are added in place of pad bits in an attempt to keep the same number of OFDM symbols per packet. Referring to FIG. 9, a chart illustrates comparisons for example rates and packet size with and without the reduced peak-to-average power ratio (PAPR) of the signal field symbol in accordance with this embodiment of the present invention. The examples are provided for various rates and packet sizes.

Figure 10A:
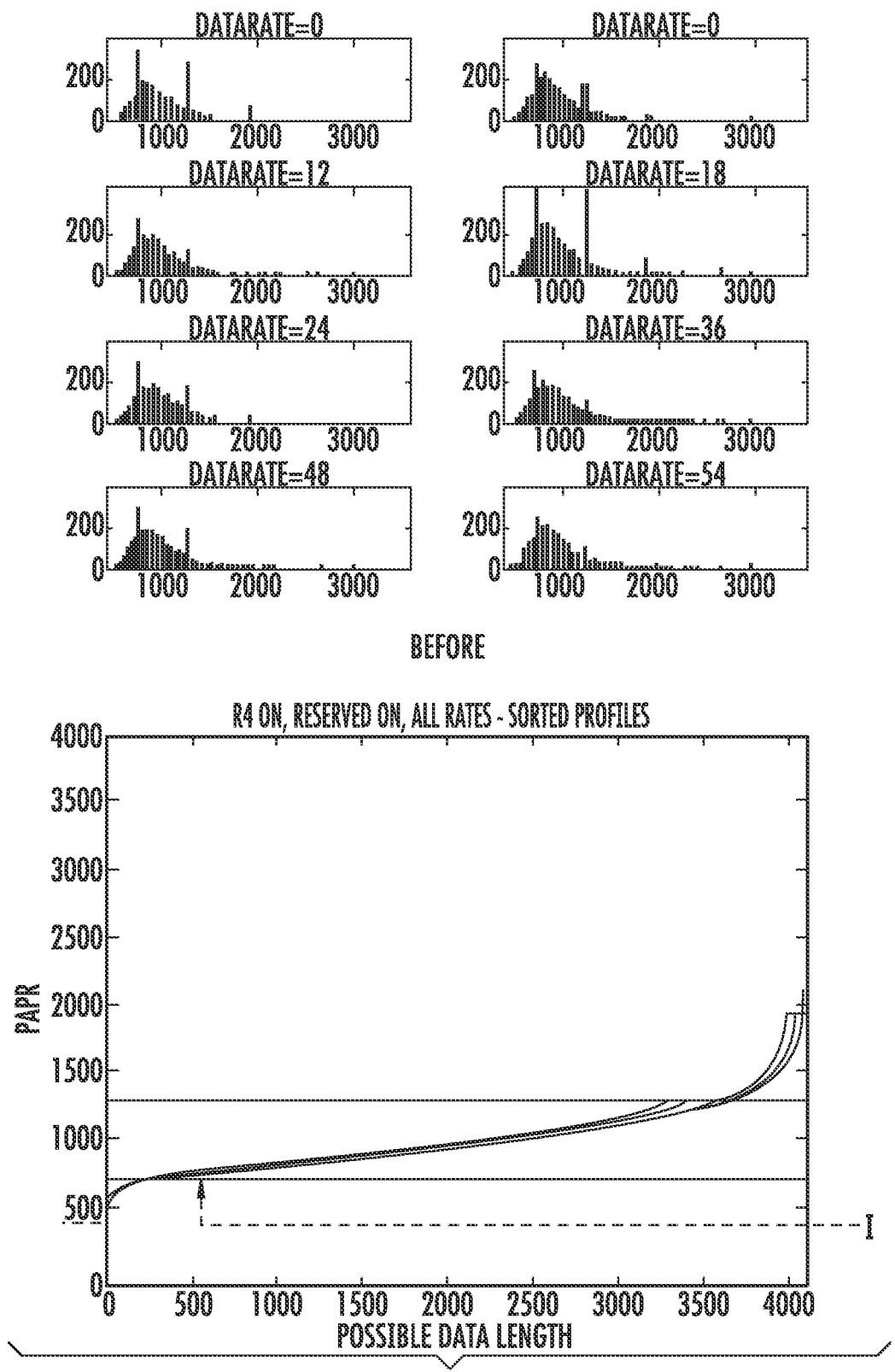
FIGS. 10A and 10B are graphic diagrams illustrating a comparison of the PAPR versus data length for various data rates with and without the reduced peak-to-average power ratio (PAPR) of the signal field symbol in accordance with another embodiment of the present invention.
Figure 10B:
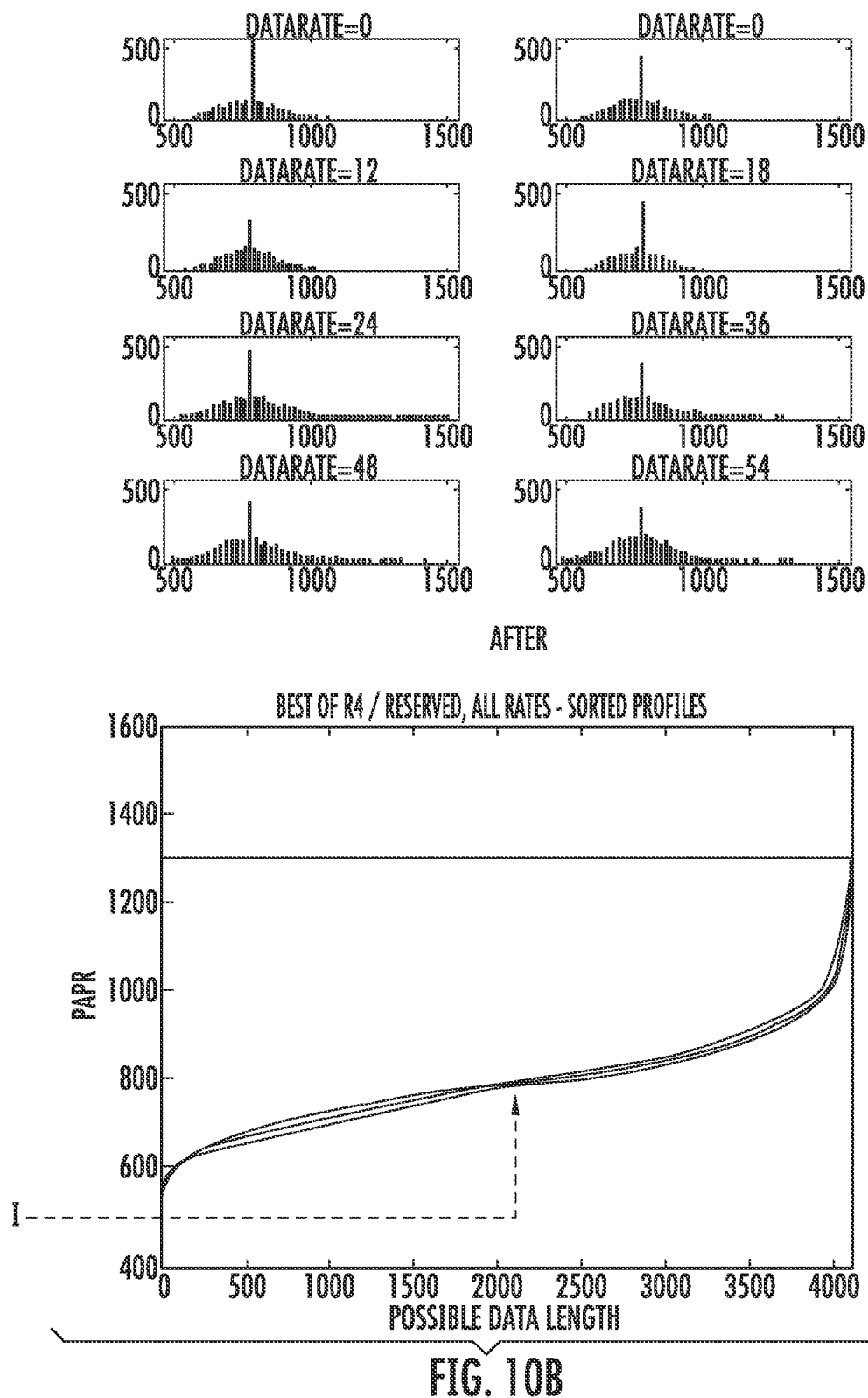

In another embodiment, selectively changing the header bits may include manipulating the last rate bit (R4 in the RATE field in FIG. 2) and/or the reserved bit to generate the signal field symbol with reduced or lowest PAPR. So, selectively changing the header bits may include setting the reserved bit to generate the signal field symbol with a reduced or lowest PAPR, setting the rate field bit to generate the signal field symbol with a reduced or lowest PAPR, or setting both to generate the signal field symbol with a reduced or lowest PAPR. Referring to FIGS. 10A and 10B, graphic diagrams illustrate a comparison of the PAPR versus data length for various data rates with and without the reduced peak-to-average power ratio (PAPR) of the signal field symbol in accordance with this embodiment of the present invention. The sorted distributions for all 4095 packet lengths are shown and an improvement, I, versus an approach without manipulation of the rate and reserved bits is indicated.

Figure 11A:
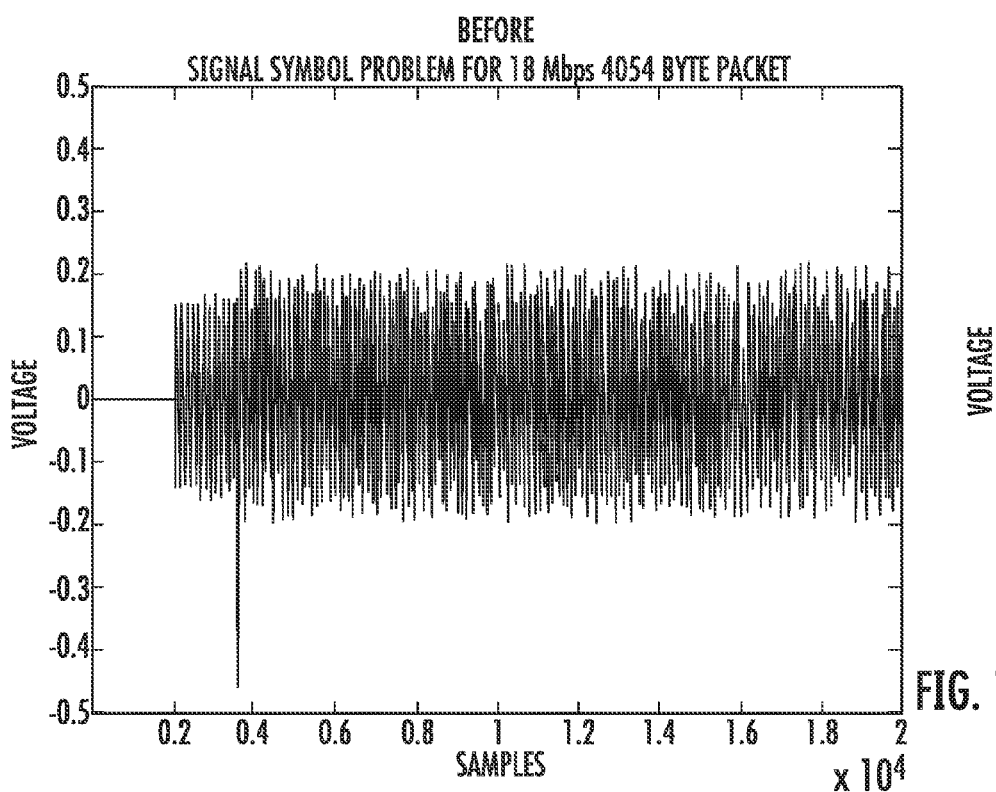
FIGS. 11A and 11B are time domain plots illustrating comparisons between the PAPR associated with a conventional signal field symbol transmission and the reduced PAPR associated with the signal field symbol transmission in accordance with features of an embodiment of the present invention.
Figure 11B:
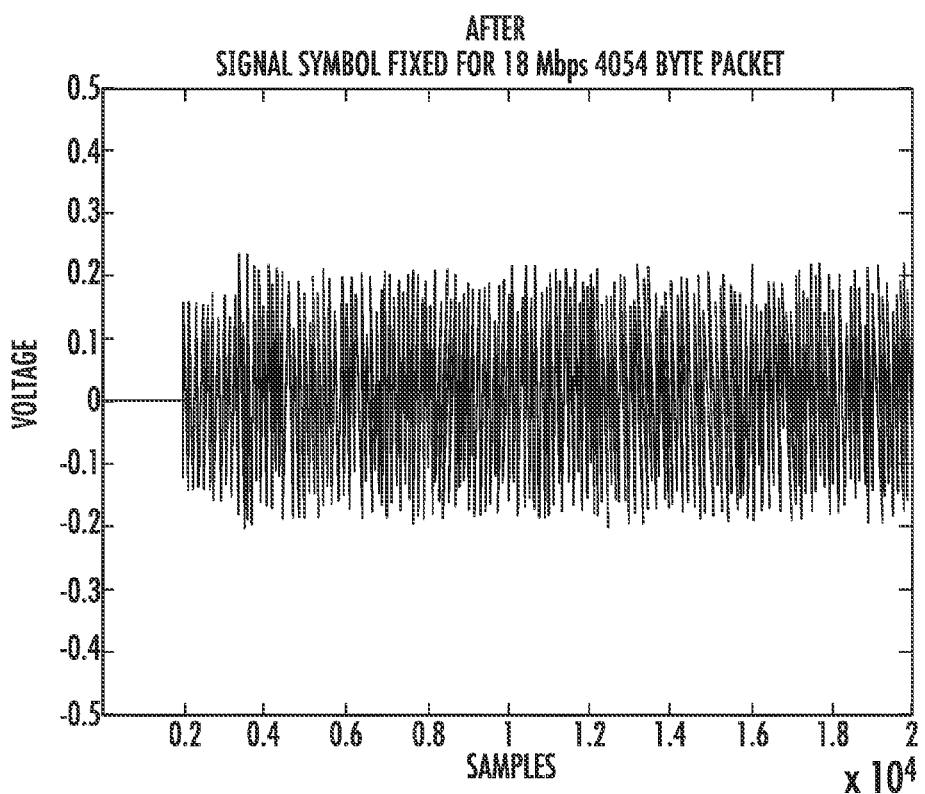

Referring to FIGS. 11A and 11B, the time domain plots illustrate comparisons between the PAPR associated with a conventional signal field symbol transmission and the reduced PAPR associated with the signal field symbol transmission in accordance with features of an embodiment of the present invention.

The embodiments of the present invention may result in increased range for multi-carrier modulation communication signals, such as for OFDM waveforms.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications device using a multi-carrier modulation communication signal, the device comprising:
   an antenna;
   a transceiver coupled to said antenna; and
   a controller operable with said transceiver and being configured to reduce the peak-to-average power ratio (PAPR) of a signal field symbol in the multi-carrier modulation communication signal by at least
      transmitting information using a frame format comprising a header and a data field, the header having a signal field and a service field each having a plurality of bits, the plurality of bits of the signal field including data rate bits, a reserved bit and data length bits and defining the signal field symbol, and the data field including payload bits and pad bits, and
      selectively changing at least the header bits to generate the signal field symbol including setting the data length bits to result in the signal field symbol with a reduced PAPR, using filler bits as pad bits to adjust for the set data length, and setting the service field bits to indicate a correct data length.

2. The wireless communications device according to claim 1, wherein the controller is further configured to transmit the information using a physical layer convergence protocol (PLCP) to map data into the frame format.

3. The wireless communications device according to claim 1, wherein the controller is further configured to selectively change the header bits by setting at least one of the data rate bits to generate the signal field symbol with a reduced PAPR.

4. The wireless communications device according to claim 1, wherein the controller is further configured to selectively change the header bits by setting the reserved bit to generate the signal field symbol with a reduced PAPR.

5. A wireless communications system including a plurality of wireless communication devices using a multi-carrier modulation communication signal, each device comprising:
   an antenna;
   a transceiver coupled to said antenna; and
   a controller operable with said transceiver and being configured to reduce the peak-to-average power ratio (PAPR) of a signal field symbol in the multi-carrier modulation communication signal by at least
      transmitting information using a frame format comprising a header and a data field, the header having a signal field and a service field each having a plurality of bits, the plurality of bits of the signal field including data rate bits, a reserved bit and data length bits and defining the signal field symbol, and the data field including payload bits and pad bits, and
      selectively changing at least the header bits to generate the signal field symbol including setting the data length bits to result in the signal field symbol with a reduced PAPR, using filler bits as pad bits to adjust for the set data length, and setting the service field bits to indicate a correct data length.

6. The system according to claim 5, wherein the controller is further configured to transmit the information using a physical layer convergence protocol (PLCP) to map data into the frame format.

7. The system according to claim 5, wherein the controller is further configured to selectively change the header bits by setting at least one of the data rate bits to generate the signal field symbol with a reduced PAPR.

8. The system according to claim 5, wherein the controller selectively is further configured to change the header bits by setting the reserved bit to generate the signal field symbol with a reduced PAPR.

9. A method for reducing the peak-to-average power ratio (PAPR) of a signal field symbol in a multi-carrier modulation communication signal, the method comprising:

transmitting information using a frame format comprising a header and a data field, the header having a signal field and a service field each having a plurality of bits, the plurality of bits of the signal field including data rate bits, a reserved bit and data length bits and defining the signal field symbol, and the data field including payload bits and pad bits; and selectively changing at least the header bits to generate the signal field symbol including setting the data length bits to result in the signal field symbol with a reduced PAPR, using filler bits as pad bits to adjust for the set data length, and setting the service field bits to indicate a correct data length.

10. The method according to claim 9, wherein transmitting information includes using a physical layer convergence protocol (PLCP) to map data into the frame format.

11. The method according to claim 9, wherein selectively changing the header bits includes setting one of the data rate bits to generate the signal field symbol with a reduced PAPR.

12. The method according to claim 9, wherein selectively changing the header bits includes setting the reserved bit to generate the signal field symbol with a reduced PAPR.

* * * * *